Oct. 27, 1970     L. A. BORNEMAN     3,536,888
SPLATTER-FREE WELDING GUN
Filed Aug. 15, 1968     3 Sheets-Sheet 1
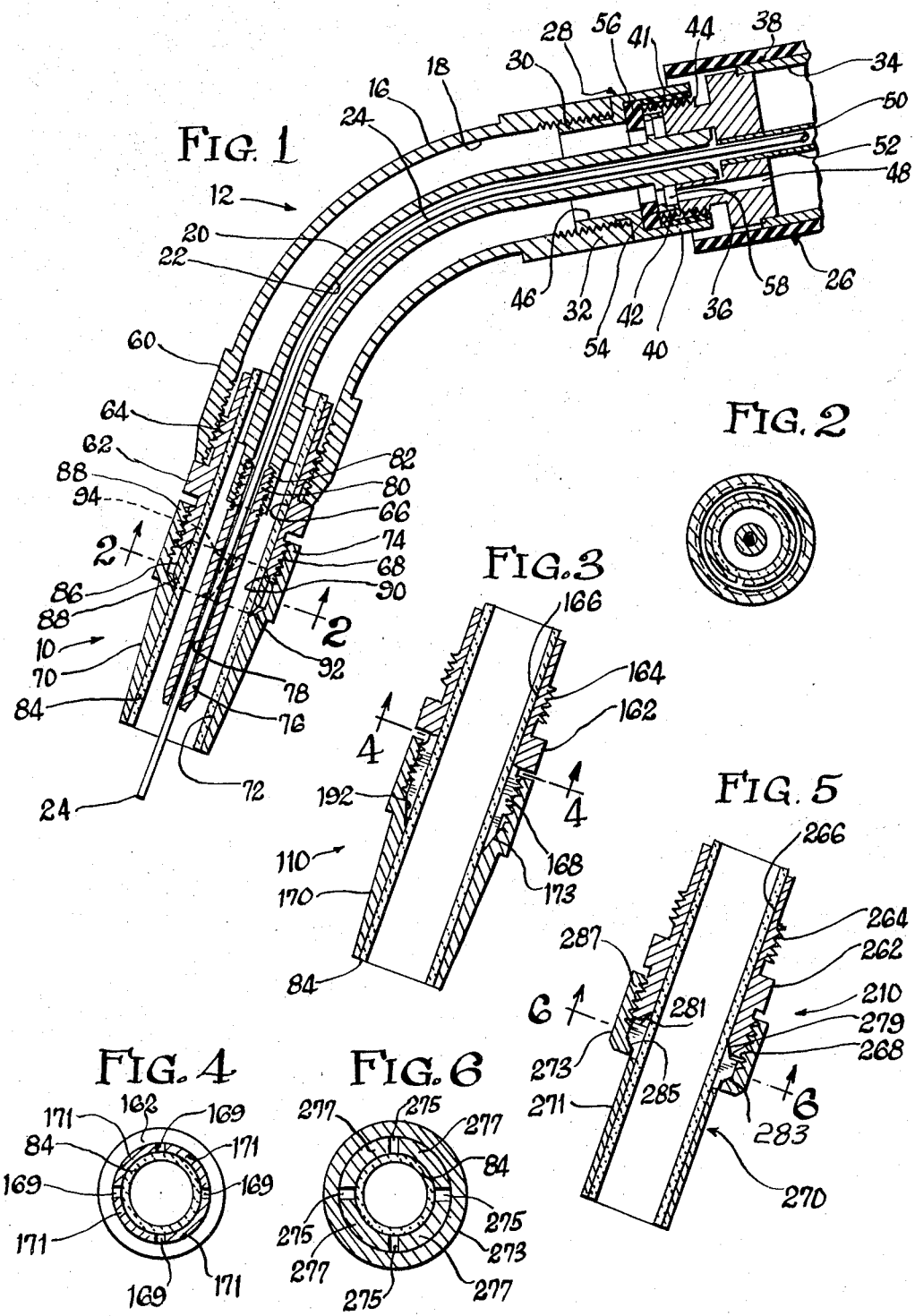
INVENTOR
Lawrence A. Borneman
By McDougall, Hersh & Scott
Attys

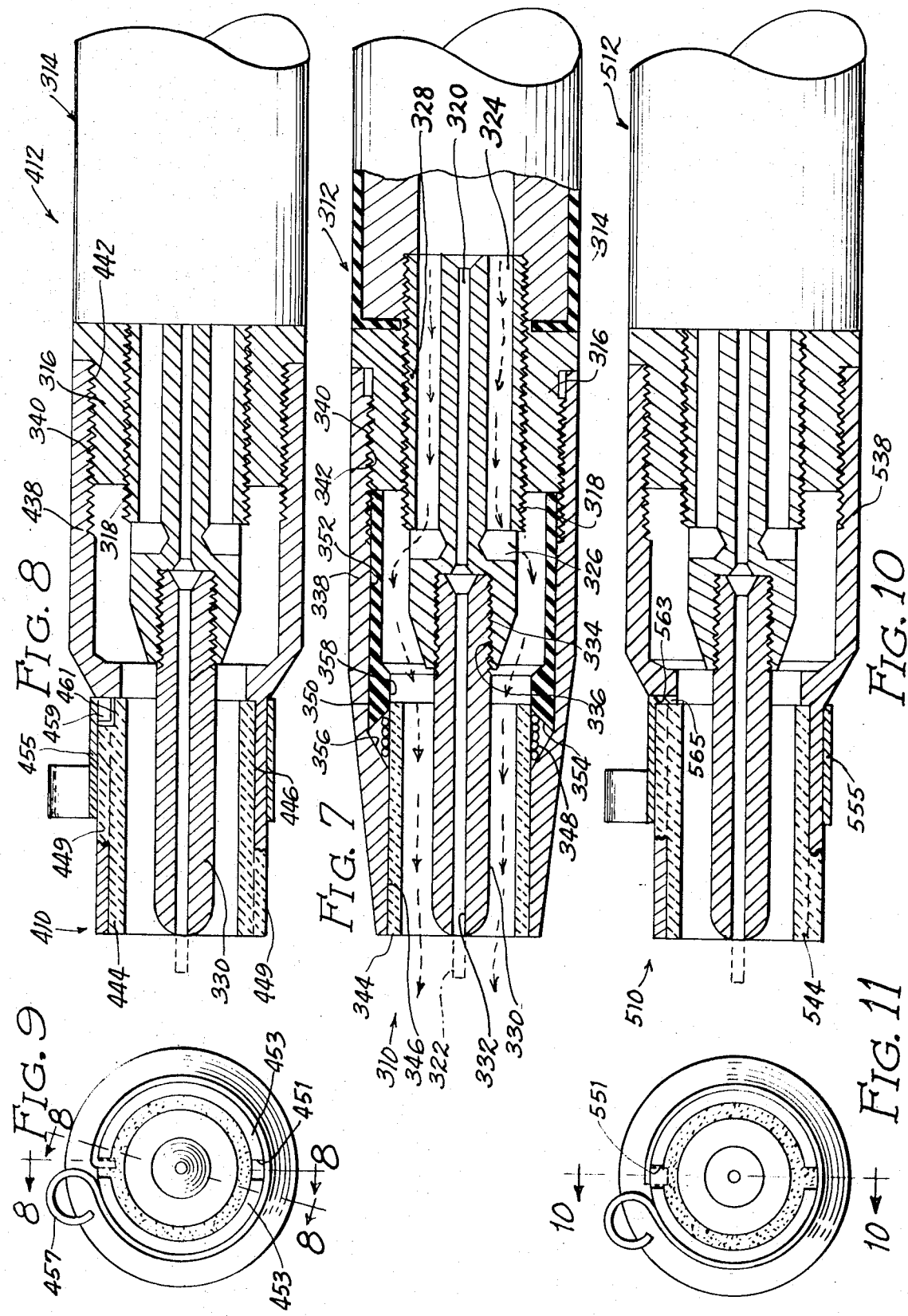

Oct. 27, 1970  L. A. BORNEMAN  3,536,888
SPLATTER-FREE WELDING GUN
Filed Aug. 15, 1968  3 Sheets-Sheet 3
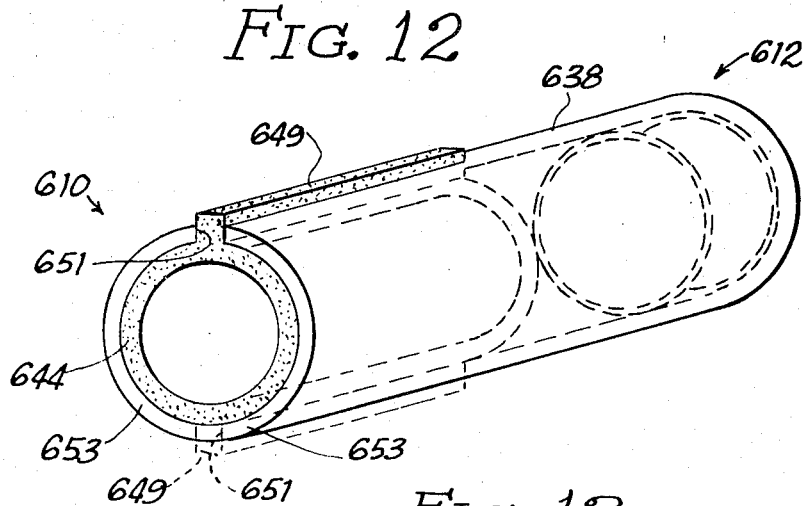
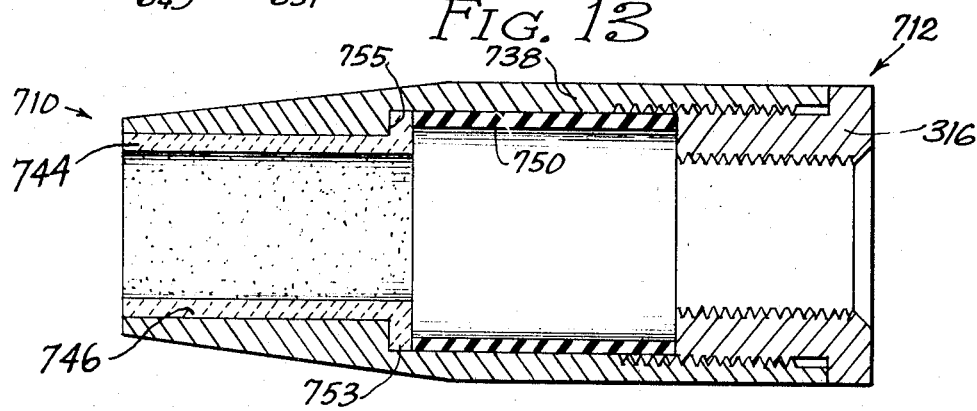
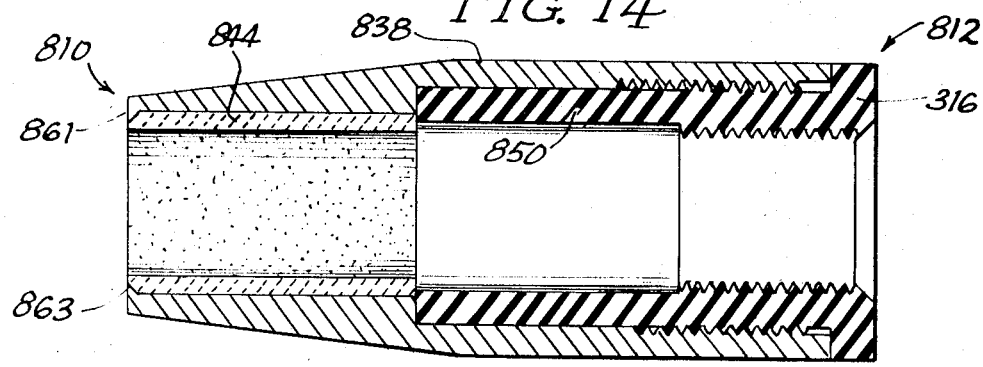
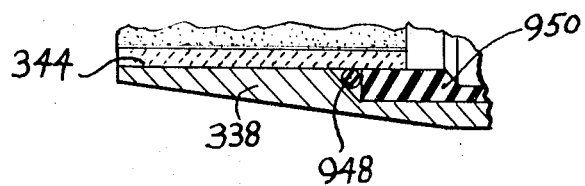

United States Patent Office 3,536,888
Patented Oct. 27, 1970

3,536,888
SPLATTER-FREE WELDING GUN
Lawrence A. Borneman, 411 W. Ethel Ave.,
Lombard, Ill. 60148
Continuation-in-part of application Ser. No. 400,856,
Oct. 14, 1964. This application Aug. 15, 1968, Ser.
No. 766,657
Int. Cl. B23k 9/32
U.S. Cl. 219—130                                             42 Claims

ABSTRACT OF THE DISCLOSURE

A welding gun, including a hollow body having a passage therein for carrying an inert gas, a tubular guide within said body and having a hollow tip member for directing the welding wire toward the work to be welded, a tubular nozzle member constituting an extension of said body, means for removably securing said nozzle member to said body, said tip member being axially disposed within the opening in said nozzle member, a refractory tube slip fitted into said opening in the nozzle member and constituting a splatter protecting liner within said nozzle member for preventing the adhesion of splattered metal therein, and holding means for disengageably retaining said refractory tube within said opening in said nozzle member.

---

This application is a continuation-in-part of my copending application Ser. No. 400,856, filed Oct. 14, 1964, now abandoned.

This invention relates to welding guns of the general type used in electric arc welding.

The present invention relates particularly to welding guns which are constructed and arranged so that the electric arc is shielded by a curtain of inert gas, such as argon or helium, for example. Such welding guns are constructed so that the arc is drawn at or near the center of a stream of the inert gas, discharged from the gun.

In such welding guns, the arc is drawn between the work to be welded and a rod or wire which usually extends axially through an opening in a nozzle in which the inert gas is discharged. The rod or wire may be consumable, in which case it supplies the metal which forms the weld. Many welding guns using a consumable welding wire have a mechanism for feeding the wire from the gun, either automatically or under the control of the welder. The present invention finds its most advantageous application to welding guns of this type, in which a consumable welding wire is automatically or semi-automatically fed from the gun and in which the wire is shielded by an annular stream of inert gas discharged from a nozzle disposed around the welding wire.

One object of the present invention is to provide a new and improved welding gun which is free from troubles experienced with prior welding guns due to the adhesion and accumulation of splattered metal within the nozzle from which the inert gas is discharged. The metal is splattered by the extreme heat of the arc, which often causes the molten metal to boil so that droplets of molten metal are sprayed into the welding gun from the arc. Prior welding guns have been troubled by the accumulation of the solidified droplets of metal within the welding nozzle. The accumulation of the splattered metal has often caused obstruction of the nozzle, so that the inert gas cannot flow freely out of the nozzle. In some guns, the splattered metal can cause electrical short circuits between the welding wire and the nozzle. To avoid such troubles, splattered metal has to be cleaned out of prior welding guns at frequent intervals.

It is a further object of the present invention to provide a new and improved welding gun which is free from the accumulation of splattered metal, so that electrical short circuits and obstruction of the nozzle are obviated. In the welding guns of the present invention, the splattered metal does not stick to the inside of the nozzle but falls freely out of the nozzle and thus does not accumulate therein.

A further object is to provide such a new and improved welding gun in which a refractory tube is removably mounted within the nozzle to prevent the accumulation of splattered metal. The splattered metal does not stick to the refractory tube but drops freely out of the nozzle.

Another object is to provide such a new and improved welding gun in which a mechanism is provided for adjustably clamping the refractory tube within the nozzle, so that the position of the tube may be adjusted as needed. If the outer end of the tube becomes eroded due to the heat of the arc, the tube can readily be moved outwardly to a new position.

A further object is to provide such a new and improved welding gun in which screw-threaded elements are employed to secure the nozzle to the gun, and in which the clamping elements for securing the refractory tube within the nozzle are actuated by tightening the screw-threaded elements.

It is another object to provide a new and improved nozzel assembly which may be applied to any of the many types of welding guns which are now being used or may be used, so that the refractory tube may be retained within the nozzle from which the inert gas is discharged.

A further object is to provide a new and improved welding gun of the foregoing construction in which the refractory tube may be made of porcelain, vitrified alumina, other ceramic and various other materials which are resistant to heat, and to which the splattered metal will not adhere.

In accordance with a further object, the refractory material may comprise various ceramics, coated with a silicate or silicone material to provide especially great freedom from the adherence of splattered metal thereto.

It is a further object to provide a new and improved welding gun of the foregoing character in which the refractory tube is protected from breakage and in which the gun is extremely strong and durable.

Another object is to provide a new and improved welding gun in which the refractory tube is readily adjustable and easy to replace.

A further object is to provide a new and improved welding gun in which the refractory tube is held captive within the nozzle during normal operation, by stop elements which retain the refractory tube in the nozzle. The refractory tube may readily be removed from the welding gun when the nozzle is removed from the gun.

Another object is to provide a new and improved welding gun in which the refractory tube is formed with a rib or other projection, adapted to extend outwardly through a slot or the like in the nozzle, to facilitate the removal of the tube from the nozzle.

It is another object to provide a new and improved welding gun having an extractor which is movably mounted on the nozzle to facilitate the extraction of the refractory tube from the nozzle.

A further object is to provide a new and improved welding gun of the foregoing character which is inexpensive and economical, both in its initial cost and in the cost of maintenance.

Further objects and advantages of the present invention will appear from the following description, taken with the accompanying drawings, in which:

FIG. 1 is a fragmentary longitudinal section taken through an electric arc welding gun or torch to be described as one illustrative embodiment of the present invention.

3

FIG. 2 is a cross-sectional view taken along the line 2—2 in FIG. 1.

FIG. 3 is a longitudinal section taken through a modified embodiment.

FIG. 4 is a cross-sectional view taken along the line 4—4 in FIG. 3.

FIG. 5 is a longitudinal section taken through another modified embodiment.

FIG. 6 is a cross section taken along the line 6—6 in FIG. 5.

FIG. 7 is a longitudinal section, showing another modified embodiment, as applied to somewhat different welding gun.

FIG. 8 is a longitudinal section showing another modified embodiment, the view having portions taken along the two slightly different section lines 8—8 shown in FIG. 9.

FIG. 9 is a front elevation of the welding gun shown in FIG. 8.

FIG. 10 is a longitudinal section of another embodiment, taken generally along the line 10—10 in FIG. 11.

FIG. 11 is a front elevation of the welding gun shown in FIG. 10.

FIG. 12 is a somewhat diagrammatic perspective view showing another modified embodiment.

FIG. 13 is a longitudinal section showing another modified embodiment.

FIG. 14 is a longitudinal section showing another embodiment.

FIG. 15 is a fragmentary section showing still another embodiment.

As shown in FIG. 1, the invention is embodied particularly in a nozzle assembly 10 for use on a welding gun or torch 12 which may be of an existing or known type. Any of the many varieties of existing welding guns may be equipped with a nozzle assembly constructed in accordance with the present invention.

The illustrated welding gun 12 comprises a tubular body 16 having a bore 18 therein for carrying inert gas. The body 16 may be made of metal, plastics or other suitable materials. As shown, the tubular body 16 is circular in cross section and is curved so that its outer end will project downwardly at a convenient angle.

A guide tube 20 is mounted within the tubular body 16. Normally, the guide tube 20 extends axially along the bore or passage 18 in the body 16. The guide tube 20 is also made of metal or other suitable material. It will be seen that the guide tube 20 has an axial bore or passage 22 therein, through which a welding wire 24 or the like may be fed.

The body 16 may be removably secured to a handle or holder 26 by suitable means, which may include an insulating bushing 28. As shown, the bushing 28 has an externally threaded outer end portion 30 which is adapted to mate with an internally threaded inner end portion 32 on the body 16. The handle or holder 26 comprises a tube 34 through which the inert gas is supplied to the welding gun. A member or plug 36 is mounted in the outer end of the tube 34. The tube 34 may be made of metal or other suitable material and may be surrounded or enclosed by a sleeve 38 made of electrically insulating material.

The bushing 28 has an inner end portion 40 which surrounds a thin bushing 41 made of electrically insulating material. The bushing 41 is fitted with an internally threaded insert 42, adapted to mate with an externally threaded portion 44 on the member 36.

The bushing 28 has a longitudinal bore or passage 46 to carry the inert gas. One or more passages 48 for the inert gas are formed in the plug or member 36. Thus, the inert gas passes from the tube 34 through the passages 48 and 46 and into the bore 18 in the body 16. It will be understood that the inert gas is supplied to the tube 34 by a hose or other suitable means.

The welding wire 24 is fed into the inner end of the guide tube 20 through a tube 50 which extends longitudinally within the holder 26. The outer end of the tube 50 is mounted in a bore 52 formed in the plug or member 36.

As shown, the guide tube 20 is formed with a flange 54 which is clamped between the member 44 and an electrically insulating washer 56 mounted on the bushing 28. One or more openings 58 are formed in the flange 54 to carry the inert gas.

While various details of a particular welding gun have been described, it will be understood that the present invention is applicable to virtually any type of welding gun.

The illustrated body 16 has an internally threaded outer end portion 60 to which the nozzle assembly 10 is removably secured. While the illustrated end portion 60 is internally threaded, the invention is also applicable to guns having an externally threaded end portion, and to guns of various other types.

The illustrated nozzle assembly 10 comprises a tubular adapter or extension 62 having an inner end portion 64 which is externally threaded so that it may be screwed into the internally threaded end portion 60 of the body 16. A cylindrical bore 66 is formed within the adapter 62. The illustrated adapter 62 has an outer end portion 68 which is also externally threaded.

The nozzle assembly 10 also comprises a nozzle member 70 which is tubular in shape and is formed with a cylindrical bore 72. The nozzle member has a inner portion 74 which is internally threaded and is adapted to mate with the externally threaded portion 68 on the adapter 62.

The outer end of the illustrated guide tube 20 is fitted with a removable welding tip member 76 having an axial bore 78 therein for carrying the welding wire 24. The tip member 76 may be made of copper or other suitable metal. As shown, the tip member has an externally threaded inner end portion 80 which is adapted to mate with an internally threaded outer end portion 82 on the guide tube 20. The tip member 76 carries the wire 24 through the nozzle assembly 10 and directs the wire toward the work to be welded. The wire 24 may be of the solid type, without a core, or of the cored type, having a core made of a welding flux material.

In accordance with the present invention, a ceramic or other refractory tube 84 is removably mounted within the nozzle assembly 10. The refractory tube prevents the accumulation of splattered metal within the nozzle assembly, inasmuch as the splattered metal will not stick to the refractory tube but drops freely out of the tube during operation. The refractory tube 84 may be made of porcelain, vitrified alumina, beryllium oxide (beryllia), zirconium silicate, zirconium oxide, magnesium aluminum silicate, corderite, mullite, or various other suitable ceramic materials. Suitable porcelains include those of the magnesium metasilicate type. Another suitable material is ceramic-graphite. Boron nitride may also be used. Refractory metals, such as tungsten, tantalum, and molybdenum, for example, are expensive but may also be used.

Such refractory materials are capable of withstanding extremely high temperatures, so that they will give long service, even though they are exposed to the extreme heat of the electric arc. Such refractory materials also are highly resistant to heat shock.

The refractory tube 84 may be made of ceramic, coated with a silicate or silicone material, particularly on the inside of the tube. With such a coating, the tube gives a particularly high degree of freedom from adherance of the splattered metal. However, in most cases, even an uncoated ceramic tube sheds the splattered metal with ease, so that the metal will not accumulate within the ceramic tube.

The refractory tube 84 is preferably adjustable within the nozzle assembly 10 so that the position of the tube may be adjusted as needed. Thus, the tube may be moved outwardly if its outer end becomes eroded due to the heat of the arc. The illustrated refractory tube 84 is cylindrical in shape and is slidably received within the bore 72 in the nozzle member 70, and also within the bore 66 in the adapter 62. The close sliding engagement between the refractory tube 84 and the metal parts 62 and 70 promotes an exchange of heat between the refractory tube and the metal parts so that the refractory tube is efficiently cooled by the metal parts. The heat generated by the arc is conducted away from the refractory tube by the metal nozzle member 70 and the metal adapter 62.

Means are provided for holding the refractory tube 84 within the nozzle assembly 10. Such holding means may comprise a clamping arrangement which is actuated by tightening the screw-threaded elements whereby the nozzle member is secured to the body of the torch.

In the construction of FIG. 1, a compression sleeve or collar 86 is slidably received around the outside of the refractory tube 84 and is mounted within the nozzle assembly 10. At at least one end, the collar 86 has an externally tapered end portion 88. In the illustrated construction the clamping collar 86 has such tapered end portions 88 at both ends.

At least one internally tapered element is provided in the nozzle assembly 10 to compress the collar 86 inwardly against the outside of the refractory tube 84. In the illustrated construction, such internally tapered elements are provided on both the adapter 62 and the nozzle member 70. Thus, the outer end of the adapter 62 is formed with an internally tapered surface 90, for engaging the tapered inner end of the collar 86. An internally tapered shoulder 92 is formed in the nozzle member 70 to engage the tapered outer end of the collar 86.

When the nozzle member 70 is screwed tightly onto the adapter 62, the interaction of the externally tapered elements 88 and the internally tapered elements 90 and 92 compresses the collar 86 inwardly against the outside of the refractory tube 84 so that the tube is securely clamped within the nozzle assembly 10. The collar 86 may be loosened simply by unscrewing the nozzle member 70 from the adapter 62. The refractory tube 84 may then be adjusted or removed. The collar 86 may be solid or may be split longitudinally by a slot 94 as shown in FIG. 2. The provision of the slot 94 makes it easier to compress the collar 86 against the outside of the refractory tube 84.

Various other arrangements may be employed for releasibly clamping the refractory tube within the nozzle assembly. FIG. 3 illustrates a modified nozzle assembly 110 which employs a different clamping arrangement. The compression collar or ring 86 is not employed in the nozzle assembly 110 of FIG. 3. Instead, the nozzle assembly 110 employs a modified adapter 162 which incorporates clamping elements to be described in detail presently. The nozzle assembly 110 also employs a slightly modified nozzle member 170.

As before, the adapter 162 has a threaded inner end portion 164, adapted to mate with the threaded end portion 60 on the body 16 of the welding gun. The refractory tube 84 is slidably received in a cylindrical bore 166 formed in the adapter 162.

The adapter 162 has an externally threaded outer end portion 168. In this case, a plurality of longitudinal slots 169 are formed in the end portion 168. In this way, the end portion 168 is split into a plurality of clamping fingers 171. As shown in FIG. 4, the illustrated construction employs four slots 169 and four clamping fingers 171. The clamping fingers 171 are adapted to be flexed inwardly against the outside of the refractory tube 84.

Externally tapered surfaces 173 are formed on the ends of the clamping fingers 171. To actuate the clamping fingers 171, the nozzle member 170 is formed with an internally tapered shoulder 192 which is engageable with the externally tapered surfaces 173. Otherwise, the nozzle member 170 may be the same as the nozzle member 70 shown in FIGS. 1 and 2.

When the nozzle member 170 is screwed onto the externally threaded portion 168 of the adapter 162, the internally tapered shoulder 192 engages the externally tapered surfaces 173 and compresses the fingers 171 inwardly against the outside of the refractory tube 84. In this way the refractory tube is securely clamped within the nozzle assembly 110. The refractory tube 84 may be released by loosening the nozzle member 170.

FIGS. 5 and 6 illustrate another modified nozzle construction 210, utilizing a modified adapter 262 and a modified nozzle member 270.

The adapter 262 of FIGS. 5 and 6 is quite similar to the adapter 62 of FIG. 1. Thus, the adapter 262 comprises a threaded inner end portion 264, a cylindrical bore 266, and a threaded outer end portion 268. It will be seen that the nozzle member 270 is formed in two parts, comprising a nozzle tube 271 and a mounting nut 273. A plurality of longitudinal slots 275 are formed in the inner end portion of the nozzle tube 271, so as to split the inner end of the nozzle tube into a plurality of clamping fingers 277. These fingers are adapted to be squeezed inwardly against the outside of the refractory tube 84. The extreme ends of the clamping fingers 277 are formed with externally tapered surfaces 279 which are engageable with an internally tapered surface 281 on the adapter 262. In addition, the clamping fingers 277 are formed with externally tapered shoulders 283 which are engageable by an internally tapered shoulder 285 inside the nut 273. It will be seen that the nut 273 has an internally threaded end portion 287 adapted to mate with the externally threaded portion 268 on the adapter 262.

When the nut 273 is tightened, the interaction of the externally tapered elements 279 and 283 with the corresponding internally tapered elements 281 and 285 compresses the fingers 277 inwardly against the outside of the refractory tube 84. In this way, the refractory tube is securely clamped within the nozzle assembly 210. The refractory tube may be released by loosening the nut 273.

It will be helpful to review the operation of the welding gun 12 as illustrated in FIG. 1. During operation, electric current is supplied to the welding wire 24 by way of the tip 76, the guide tube 20, and the elements 34 and 36 of the holder 26. The electric current may be supplied to the holder 26 by means of a suitable cable, as will be understood by those skilled in the art. The other side of the electrical welding circuit is connected to the workpiece by means of another electric cable. Argon, helium or other inert gas is supplied under pressure to the holder 26 so that the gas will flow through the tubular body 16 of the welding gun. The inert gas is discharged around the wire 24 by the refractory tube 84 within the nozzle member 70.

As in conventional welding operations, an arc is struck between the end of the wire 24 and the work to be welded. The extreme heat of the arc often causes the molten metal to boil so that droplets of the metal are splattered or sprayed into the welding gun. However, the splattered metal does not adhere to the refractory tube 84. Instead, the splattered metal simply drops out of the tube 84. Thus, there is no accumulation of splattered metal within the tube 84. Accordingly, there is no possibility that a short circuit may develop between the welding tip 76 and the nozzle member 70. Moreover, the splattered metal does not obstruct the flow of the inert gas through the refractory tube 84.

The refractory tube 84 is preferably made of a ceramic material or the like so as to act as an electrical insulator to obviate any possibility of an arc being formed, or a short circuit developing between the welding tip 76, or the wire 24, and the nozzle member 70. The refractory tube 84 also acts as an electrically insulating liner within the adapter 62 and the outer end portion of the body 16.

Moreover, the refractory tube 84 acts as a heat resisting liner for the nozzle member 70 and the adapter 62. The ceramic or other similar material of the liner is capable of withstanding the extreme heat of the arc. The tube 84 is efficiently cooled by the conduction of heat through the metal nozzle member 70 and the metal adapter 62.

During operation, the refractory tube 84 is clamped within the nozzle assembly. The clamping mechanism is actuated by tightening the screw-threaded elements whereby the nozzle member is secured to the welding gun. This is true of the three embodiments of FIGS. 1, 3 and 5. In the embodiment of FIG. 1, the refractory tube 84 is clamped by the compression collar or ring 86. In the embodiment of FIG. 3, the clamping elements are the fingers 171 on the adapter 162. In the case of the embodiment of FIG. 5, the refractory tube 84 is clamped by the fingers 277 on the nozzle tube 271. In each case, the refractory tube 84 is released by loosening the screw threads whereby the nozzle member is secured to the adapter. Thus, the position of the refractory tube may readily be adjusted to compensate for wear or varying conditions of operation. Moreover, the refractory tube may readily be removed and replaced as needed.

However, the refractory tube will give long service. It is entirely enclosed within the nozzle assembly and is fully protected from breakage. Moreover, the refractory tube is capable of withstanding the extreme heat of the electric arc.

The refractory tube is of a simple cylindrical form and this is inexpensive. Accordingly, the cost of maintaining the welding gun is low. The entire nozzle assembly is made up of inexpensive parts which are easy to manufacture. Thus, the initial cost of the nozzle assembly is low. The refractory tube protects the metal parts of the nozzle from the arc and from the metal splattered by the arc, so that replacement of the metal parts is seldom, if ever, necessary.

FIG. 7 illustrates another embodiment of the invention, in the form of a modified nozzle assembly 310 for a welding gun 312. It will be seen that the welding gun 312 comprises a body 314 which may be made of metal covered with rubber or some other insulating material. Any other suitable material may be employed in the body 314.

As illustrated, a bushing or extension 316 is mounted on a tubular guide 318, which in turn is mounted on the body 134. An axial bore 320 is formed in the tubular guide 318 to receive the welding wire 322. Moreover, passages 324 are formed in the tubular guide 318 to carry the inert gas. The passage 324 extends longitudinally along the tubular guide 318 and connect with ports 326 which extend outwardly near the outer end of the guide 318.

As shown, the tubular guide 318 is externally threaded and is mated with an internally threaded bore 328 in the adaptor bushing 316. Preferably, the bushing 316 is made of electrically insulating material. The guide 318 may be screwed into the body 314.

The tubular guide 318 is fitted with a removable welding tip member 330 having an axial bore 332 therein adapted to carry the welding wire. The tip member 332 is preferably made of copper or some other electrically conductive material. As shown, the tip member 330 has an externally threaded inner end portion 334, adapted to be screwed into an internally threaded bore 336 in the guide 318.

A nozzle member 338 is removably connected to the body 314 of the welding gun 312. Preferably, the nozzle member 338 is mounted on the bushing 316 which serves as an extension in this case to connect the nozzle member 338 to the bushing 316. Thus, the bushing 316 has an externally threaded portion 340, adapted to receive an internally threaded portion 342 on the inner end of the nozzle member 338.

The inside of the nozzle member 338 is protected from weld splatter by a refractory tube 344 which corresponds generally to the refractory tube 84, previously described. The refractory tube 344 acts as a removable liner within an axial bore or opening 346, formed in the nozzle member 338. As previously described, the refractory tube 344 may be made of various heat resisting materials, to which the splattered metal will not adhere. Thus, the refractory tube 344 may be made of various ceramics, ceramic-graphite, refractory metals, and other refractory materials. Ceramics are generally preferred, because of their reasonably low cost and highly satisfactory performance.

The illustrated refractory tube 344 is in the form of a simple cylinder and thus is easy to manufacture and low in cost. It will be seen that the refractory tube 344 has a wall thickness which is small, relative to the diameter of the tube. It has been found that thin walled refractory tubes of this type are highly resistant to heat shock.

The refractory tube 344 slips easily into the bore 346, so that it is easy to install the refractory tube in the nozzle member 338. Means are provided for retaining the refractory tube 344 within the nozzle member 338 during normal operation of the welding gun 312. The retaining means may assume many forms. As shown, the retaining arrangement utilizes a coil spring 348 which is snugly mounted around the outside of the refractory tube 344. The retainer spring 348 is tight enough to prevent accidential movement of the refractory tube 344, but may be removed and replaced manually on the refractory tube.

In the illustrated construction, the retainer spring 348 is held captive between elements on the nozzle member 338 and another member 350 which acts as an extension of the body 314. As shown, the member 350 is in the form of a bushing which provides a liner within a bore 352 in the nozzle member 338. The bore 352 is larger than the bore 346.

It will be seen that the bushing 350 extends between the bushing 314 and one end of the retainer spring 348. The outer end of the bushing 350 has an internally chamfered end surface 354 which engages the end of the spring 348 and tends to compress the spring more tightly around the refractory tube 344. The other end of the spring 348 is engageable with an internally chamfered shoulder 356, formed in the nozzle member 338 between the bores 346 and 352. Here again, the chamfered or frusto-conical shoulder 356 tends to compress the spring 348 more tightly around the refractory tube 344.

In the illustrated construction, the inner end of the refractory tube 344 slips into a bore or opening 358 formed in the bushing 350. Thus, the refractory tube 344 and the bushing 350 protect the entire inside of the nozzle member 338.

The bushing 350 is preferably made of an electrically insulating material, such as various heat resisting plastic materials. Suitable materials include heat resistant Bakelite, Bakelite linen, polysulfone, and polyester plastics. However, the bushing 350 may also be made of other suitable materials, such as steel or other metals.

The refractory tube 344 prevents any accumulation of splattered metal within the nozzle member 338, in the manner previously described with reference to the refractory tube 84. The splattered metal does not adhere to the refractory material of the tube 344. Moreover, the stream of inert gas tends to blow out the globules of metal. The refractory tube 344 resists the extreme heat of the arc and will give long trouble-free service.

The refractory tube 344 acts as a liner within the outer portion of the nozzle member 338, this being the portion which is subjected to the extreme heat of the arc. The remainder of the nozzle 338 is lined by the bushing 350, which is preferably made of an insulating material so as to obviate any possiblity of a short circuit between the nozzle member 338 and the guide member 318 for the welding wire 322. The bushing 350 is spaced back some distance from the arc, and thus is subjected to much less heat than in the case of the refractory tube 344. Thus, the bushing 350 may be made of various heat resisting plastic materials. Steel or other suitable materials may also be employed.

It is an easy matter to remove and install the refractory tube 344. To remove the refractory tube 344, the nozzle member 338 is unscrewed from the adapter bushing 316. The extension bushing 350 and the refractory tube 344 may then be slipped out of the nozzle member 338. The retaining spring 348 comes out of the nozzle member 338 with the refractory tube 344.

When a new refractory tube 344 is to be installed, the spring 348 is transferred to the new tube. The new tube 344 and the bushing 350 are then slipped into the nozzle member 338, and the nozzle member is screwed onto the bushing 316. The tightening of the screw threads results in the compression of the spring 348 between the chamfered end surface 354 on the bushing 350 and the chamfered shoulder 356 on the nozzle member 338. Thus the spring 348 is tightly clamped around the refractory tube 344, so that it is securely retained with the nozzle member 338.

The position of the refractory tube 344 may be adjusted by loosening the nozzle member 338 and sliding the refractory tube within the spring 348. Thus, the refractory tube 344 may be advanced if its outer end becomes eroded by the arc.

FIGS. 8 and 9 illustrate another embodiment of the invention in the form of a nozzle assembly 410 for a welding gun 412. It will be seen that several components of the welding gun 412 are the same as illustrated in FIG. 7. This applies to the body 314, the adapter bushing 316, the tubular guide 318, and the tip member 330. It will not be necessary to repeat the description of these components.

The welding gun 412 comprises a modified nozzle member 438 adapted to be screwed onto the bushing 316 in the same manner as previously described. Thus, the nozzle member 438 has an internally threaded portion 442, adapted to mate with the externally threaded portion 340 on the bushing 316.

The welding gun 412 utilizes a modified refractory tube 444, adapted to act as a liner within a bore or opening 446 in the nozzle member 438. Instead of being in the form of a simple cylinder, the refractory tube 444 is formed with one or more outward projections, preferably in the form of longitudinal ribs 449. Two such ribs 449, diametrically opposite from each other are employed in the illustrated construction.

One or more slots 451 are formed in the illustrated nozzle member 438 to receive the ribs 449. By virtue of the slots 451 the nozzle member 438 is split into at least two clamping elements 453, adapted to press against the outside of the refractory tube 444, so as to retain it in the nozzle member 438.

The clamping forces between the refractory tube 444 and the clamping elements 453 may be provided entirely by the springiness of the nozzle member 438. However, it is preferred to employ a spring 455 for compressing the clamping elements 453 of the nozzle member 438 against the refractory tube 444. As shown, the spring 455 is in the form of a generally circular ring made from a strip of spring metal. One end of the spring 455 is preferably formed outwardly into a loop 457 to provide a handle. Thus, the spring 455 may easily be moved along the outside of the nozzle member 438.

In this case, the spring 455 also serves as an extractor for removing the refractory tube 444 from the nozzle member 438. For this purpose, the spring 455 is formed with an inwardly projecting tang or ear 459 which is engageable with one of the ribs 449 on the refractory tube 444. The tube 444 is preferably formed with a notch or recess 461 to receive the tang 459. The refractory tube 444 may be extracted by sliding the spring 455 outwardly along the nozzle member 438. A new refractory tube 444 may then be slipped into the nozzle member 438.

FIGS. 10 and 11 illustrate a slightly modified nozzle construction 510 for a welding gun 512. The nozzle construction 510 utilizes a modified nozzle member 538 which is lined by a modified refractory tube 544. A modified spring 555 is also employed. The other components are the same as previously described in connection with FIGS. 8 and 9.

In the modified construction of FIGS. 10 and 11, the refractory tube 544 is the same as the tube 444, except the the notch or recess 461 is omitted. The nozzle member 538 is the same as the nozzle member 438 except that one of the slots 551 is extended rearwardly to form an opening 563 for the extractor spring 555.

It will be seen that the spring 555 is the same as the spring 455, except that the tang 459 is replaced with a tab 565 which fits closely within the opening 563, so as to prevent any loss of the inert gas. As before, the refractory tube 544 may be extracted from the nozzle 538 by sliding the spring 555 outwardly along the nozzle member 538. The tab 565 is adapted to slide along one of the slots 551.

FIG. 12 illustrates another embodiment in the form of a modified nozzle assembly 610 for a welding gun 612. The nozzle assembly 610 is similar in most respects to the construction illustrated in FIGS. 8 and 9. However, the nozzle assembly 610 utilizes a modified nozzle member 638 and a modified refractory tube 644. The spring 455 is omitted, so that the refractory tube 644 is retained by the springiness of the nozzle member 638.

As before, the refractory tube 644 comprises one or more outward projections or ribs 649, adapted to be received in slots 651 which are formed in the nozzle member 638. Thus the nozzle member 638 is split into a pair of clamping elements 653.

To assist in extracting the refractory tube 644 from the nozzle member 638, one or both of the ribs 649 are arranged to project outwardly beyond the nozzle member 638. Thus, it is an easy matter to push on the projecting rib or ribs to slide the refractory tube 644 out of the nozzle member 638.

FIG. 13 illustrates another embodiment in the form of a nozzle assembly 710 for a welding gun 712. The nozzle assembly 710 utilizes a modified nozzle member 738 which screws onto the bushing 316, as before. A modified refractory tube 744 is slidably fitted into a bore or opening 746 in the nozzle member 738 and is held captive in the nozzle member by a modified bushing 750.

Instead of being in the form of a simple cylinder, the refractory tube 744 is formed with an outwardly projecting flange 753, adapted to engage a shoulder 755 on the inside of the nozzle member 738. The flange 753 is retained between the shoulder 755 and the bushing 750. In this case, the bushing 750 is in the form of a simple cylinder. Otherwise, the bushing 750 is similar to the bushing 350, previously described.

The refractory tube 744 may easily be removed by unscrewing the nozzle member 738 from the bushing 316. The refractory tube 744 and the bushing 750 may then be slipped out of the nozzle member 738.

FIG. 14 illustrates still another embodiment, in the form of a modified nozzle assembly 810 for a welding gun 812. The construction is similar to that of FIG. 13, but utilizes a modified nozzle member 838, a modified refractory tube 844, and a modified retaining element 850. In this case, the refractory tube 844 is held captive between the retaining element 850 and a flange 861 on the nozzle member 838. The flange 861 projects inwardly and is engageable with a chamfered end surface 863 on the refractory tube 844. It will be understood that the flange 861 and the end surface 863 may assume various forms.

In this case, the retaining element 850 is similar to the bushing 750 but is formed integrally with the bushing 316. A separate bushing could also be employed.

As before, the refractory tube 344 may be removed by unscrewing the nozzle member 838 from the bushing 316. The refractory tube 844 can then be slipped out of the nozzle member 838.

FIG. 15 illustrates still another embodiment, comprising a nozzle assembly 910 which is similar to the nozzle assembly 310 of FIG. 7, except that the spring 348 is replaced by an O-ring 948, made of rubber or some other soft resilient material, such as a suitable plastic material. The O-ring 948 is stretched around the refractory tube 344 and is held captive between the nozzle member 338 and a slightly modified bushing 950. When the nozzle member 338 is screwed onto the bushing 316, the O-ring 948 is compressed so that it grips the refractory tube 344 with increased clamping pressure. In this way, the refractory tube 344 is resiliently retained within the nozzle member 338. When the refractory tube 344 is replaced with a new tube, the O-ring may also be replaced.

The welding nozzles of the present invention speed up the welding operations by obviating any need for removing splattered metal from the welding guns. Thus, increased production is achieved with the welding guns of the present invention. Moreover, the welding guns are inexpensive in first cost and inexpensive to maintain.

Various other modifications, alternative constructions and equivalents may be employed without departing from the true spirit and scope of the invention, as exemplified in the foregoing description and defined in the following claims.

I claim:
1. A welding gun, comprising the combination of
a hollow body having a passage therein for carrying an inert gas,
a tubular guide mounted within said body and extending along said passage for carrying a welding wire,
said guide having a hollow tip member for directing the welding wire toward the work to be welded,
a tubular nozzle member constituting an extension of said body,
said nozzle member having inner and outer end portions,
means for removably connecting said inner end portion of said nozzle member to said body,
said nozzle member having a generally cylindrical opening formed in said outer end portion thereof,
said tip member of said tubular guide being axially disposed within said opening in said nozzle member,
a splatter-protecting refractory tube slip fitted into said opening and constituting a liner within said nozzle member for preventing the accumulation of splattered metal therein,
said tube being effective to direct the inert gas against the work to be welded,
said nozzle member having an outer end,
said tip member having an outer end portion,
said refractory tube having an end located substantially at said outer end of said nozzle member and extend-from substantially said outer end of said nozzle member within said opening and along at least the outer end portion of said tip member,
and holding means for disengageably retaining said tube within said opening in said nozzle member.

2. A welding gun according to claim 1,
in which said refractory tube is made of ceramic material.

3. A welding gun according to claim 1,
in which said refractory tube is made of a magnesium aluminum silicate ceramic material.

4. A welding gun according to claim 1,
in which said refractory tube is made of an alumina ceramic material.

5. A welding gun according to claim 1,
in which said refractory tube is made of a zirconium silicate ceramic material.

6. A welding gun according to claim 1,
in which said refractory tube is made of a beryllia ceramic material.

7. A welding gun according to claim 1,
in which said refractory tube is made of a ceramic-graphite material.

8. A welding gun according to claim 1,
in which said refractory tube is made of a boron nitride material.

9. A welding gun according to claim 1,
in which said holding means comprise a clamping device for removably retaining said tube within said opening in said nozzle member.

10. A welding gun according to claim 1,
in which said holding means comprise a clamping element extending around and engageable with the outside of said tube,
and means operable by the connection of said nozzle member to said body for tightening said clamping element.

11. A welding gun according to claim 1,
including screw threaded elements removably connecting said nozzle member to said body,
said holding means comprising a clamping element extending around and engageable with said tube,
and means operable by the tightening of said screw threaded elements for tightening said clamping element.

12. A welding gun according to claim 11,
in which said clamping element comprises a compressible clamping collar mounted around the outside of said tube.

13. A welding gun according to claim 11,
in which said clamping element comprises a coil spring mounted around the outside of said tube.

14. A welding gun according to claim 1,
including screw threaded elements for removably connecting said nozzle member to said body,
said holding means comprising a clamping element extending around and engageable with the outside of said tube,
and actuating means operable by the tightening of said screw threaded elements for tightening said clamping element,
said actuating means including a first element on the inside of said nozzle member for engaging one side of said clamping element,
and a second element extending from said body for engaging the opposite side of said clamping element.

15. A welding gun according to claim 14,
in which said first element comprises a shoulder formed within said nozzle member.

16. A welding gun according to claim 14,
in which said second element comprises a tubular extension connected to said body and extending within said nozzle member.

17. A welding gun according to claim 14,
in which said second element comprises a bushing received within said nozzle member and extending between said body and said clamping element.

18. A welding gun according to claim 1,
in which said holding means comprise at least one clamping element formed on said nozzle member and engageable with said refractory tube.

19. A welding gun according to claim 1,
in which said holding means comprise clamping elements on said nozzle member and engageable with the outside of said tube,
said clamping elements being formed by at least one slot in said nozzle member.

20. A welding gun according to claim 19,
including screw threaded elements for connecting said nozzle member to said body,
said clamping elements being actuable by tightening of said screw threaded elements.

21. A welding gun according to claim 19,
including spring means for tightening actuating said clamping elements.

22. A welding gun according to claim 19,
including a spring disposed around said nozzle member for compressing said clamping elements inwardly against said tube.

23. A welding gun according to claim 19, including a spring mounted on said nozzle member for tightening said clamping elements, said spring being slidable along said nozzle member, and a member on said spring projecting into said slot and engaging said tube for extracting said tube from said nozzle member.

24. A welding gun according to claim 19, including an extracting member movable along said nozzle and having an element projecting into said slot and engaging said tube for extracting said tube from said nozzle member.

25. A welding gun according to claim 1, in which said holding means comprise a member connected to said body and having a clamping element for engaging said tube.

26. A welding gun according to claim 25, including screw threaded elements for connecting said nozzle member to said body, and means operable by tightening of said screw threaded elements for tightening said clamping element.

27. A welding gun according to claim 1, in which said nozzle member is formed with at least one slot, said tube being formed with at least one rib element projecting outwardly through said slot for extracting said tube from said nozzle member.

28. A welding gun according to claim 1, in which said nozzle member is formed with at least one slot, said tube being formed with at least one rib projecting into said slot, and an extractor mounted on said nozzle member and having an element engageable with said rib for extracting said tube from said nozzle member.

29. A welding gun according to claim 28, in which said extractor comprises a spring for compressing said nozzle member against said tube.

30. A welding gun according to claim 1, in which said holding means comprise stop elements for preventing longitudinal movement of said tube out of said nozzle member.

31. A welding gun according to claim 30, in which said stop elements comprise inter-engaging shoulders on said tube and said nozzle member.

32. A welding gun according to claim 30, in which said stop elements comprise a flange on said tube and a shoulder on said nozzle member.

33. A welding gun according to claim 30, in which said stop elements include a flange on said nozzle member and an edge portion on said tube.

34. A welding gun, comprising the combination of a hollow tubular body having a passage therein for carrying an inert gas, a guide tube mounted within said body and extending along said passage for carrying a welding wire, said guide tube having a hollow tip member for directing the welding wire toward the work to be welded, a tubular adapter, means removably securing said adapter to the outer end of said tubular body, a tubular nozzle member constituting an extention of said adapter, mating screw threaded elements for removably securing nozzle member to said adapter, said adapter and said nozzle member having aligned cylindrical bores therein, said tip member of said guide tube being axially disposed within said bore in said nozzle member, a splatter-protecting cylindrical ceramic tube slidably fitted in said cylindrical bores and constituting a liner within said adapter and said nozzle member for preventing the accumulation of splattered metal therein, said ceramic tube being effective to direct the inert gas against the work to be welded, said nozzle member having an outer end, said tip member having an outer end portion, said ceramic tube having an end located substantially at said outer end of said nozzle member and extending from substantially said outer end of said nozzle member within said bore therein and along at least the outer end portion of said tip member, said ceramic tube corresponding in length to the combined lengths of said nozzle member and said adapted whereby said bores therein are completely lined by said ceramic tube, and clamping means operative by the tightening of said screw threaded elements for disengageably clamping said ceramic tube within said bores in said nozzle member and said adapter.

35. A welding gun according to claim 34, in which said clamping means comprise a compression collar slidably fitted around the outside of said ceramic tube between said adapted and said nozzle member, said collar having externally tapered end portions, said adapter and said nozzle member having internally tapered portions engageable with said externally tapered end portions on said collar for compressing said collar around the outside of said ceramic tube when said mating screw threaded elements are tightened.

36. A welding gun according to claim 34, in which said clamping means comprise an end portion on said adapter having a plurality of longitudinal slots therein forming a plurality of clamping fingers between said slots, said clamping fingers having externally tapered terminal portions, and an internally tapered portion on said nozzle member and engageable with said externally tapered terminal portions for compressing said clamping fingers inwardly against and around said ceramic tube when such mating screw threaded elements are tightened.

37. A welding gun according to claim 34, in which said clamping means comprise an end portion at the inner end of said nozzle member, said end portion having a plurality of longitudinal slots therein forming a plurality of clamping fingers between said slots, said clamping fingers having externally tapered surfaces, and an internally tapered surface on said adapter and engageable with said externally tapered surfaces on said clamping fingers for compressing said clamping fingers inwardly against the outside of said ceramic tube when said mating screw threaded elements are tightened.

38. A welding gun according to claim 1, in which said refractory tube is made essentially of alumina with a silicate coating to shed splattered metal.

39. A welding gun according to claim 1, in which said refractory tube is made essentially of alumina with a silicone coating to shed splattered metal.

40. A welding gun according to claim 1, in which said refractory tube is made of a zirconium oxide ceramic material.

41. A welding gun according to claim 11, in which said clamping element comprises an O-ring mounted around the outside of said tube.

42. A welding gun according to claim 1, in which said refractory tube is made of mullite ceramic material.

References Cited

UNITED STATES PATENTS

| | | | |
|---|---|---|---|
| 2,965,746 | 12/1960 | Cresswell | 219—130 X |
| 2,761,049 | 8/1958 | McElrath et al. | 219—75 X |
| 2,992,320 | 7/1961 | Hill | 219—75 |
| 3,091,920 | 6/1963 | Matvay | 219—75 X |
| 3,189,723 | 6/1965 | Adamson | 219—130 |

FOREIGN PATENTS 1,163,046  9/1958  France.

JOSEPH V. TRUHE, Primary Examiner

J. G. SMITH, Assistant Examiner

U.S. Cl. X.R.

219—136

PO-1050
(5/69)

UNITED STATES PATENT OFFICE
CERTIFICATE OF CORRECTION

Patent No. 3,536,888      Dated October 27, 1970

Inventor(s) L. A. Borneman

It is certified that error appears in the above-identified patent and that said Letters Patent are hereby corrected as shown below:

Column 4, line 57, change "tantalium" to "tantalum".
Column 7, line 47, change "passage" to "passages".
Column 7, line 67, after "extension" insert "of the body 314. Screw threaded elements are employed".
Column 11, line 52, change "extend-" to "extending".
Column 12, line 70, delete "actuating".
Column 13, line 65, change "extention" to "extension".
Column 14, line 15, change "adapted" to "adapter".
Column 14, line 24, change "adapted" to "adapter".

SIGNED AND
SEALED

FEB 23 1971

(SEAL)
Attest:

Edward M. Fletcher, Jr.
Attesting Officer

WILLIAM E. SCHUYLER, JR.
Commissioner of Patents